US006654987B1

(12) United States Patent
Wu

(10) Patent No.: US 6,654,987 B1
(45) Date of Patent: Dec. 2, 2003

(54) RATCHET STRAP TIGHTENER

(76) Inventor: Peter Wu, No. 66, Kunghsi 1st Rd., Chuanhsing Ind. Park, Shengkang Hsiang, Changhua Hsien (TW)

( * ) Notice: Subject to any disclaimer, the term of this patent is extended or adjusted under 35 U.S.C. 154(b) by 0 days.

(21) Appl. No.: 10/301,985

(22) Filed: Nov. 22, 2002

(51) Int. Cl.[7] ............................................. B25B 25/00
(52) U.S. Cl. ................................... 24/68 CD; 24/909
(58) Field of Search .............................. 24/68 CD, 909; 410/100, 103, 104, 12; 254/217, 218, 237, 223, 222

(56) References Cited

U.S. PATENT DOCUMENTS

| | | | | |
|---|---|---|---|---|
| 3,279,760 A | * | 10/1966 | Bathum, Sr. ................ | 254/376 |
| 4,199,182 A | * | 4/1980 | Sunesson .................. | 24/68 CD |
| 5,426,826 A | * | 6/1995 | Takimoto .................. | 24/68 CD |
| 5,745,959 A | * | 5/1998 | Dodge ..................... | 24/68 SK |

FOREIGN PATENT DOCUMENTS

| | | | | |
|---|---|---|---|---|
| EP | 311828 A2 | * | 4/1989 | ......... A44B/11/12 |
| WO | WO 9629274 A1 | * | 9/1996 | ......... B66D/1/74 |

* cited by examiner

*Primary Examiner*—James R. Brittain
(74) *Attorney, Agent, or Firm*—Alan Kamrath; Rider, Bennett, LLP

(57) ABSTRACT

A ratchet strap tightener is manufactured by a plastic injection molding process and includes a body, a lever and a ratchet device. The body has two parallel strap holders adapted to hold one end of a strap. The lever is pivotally attached to the body with the ratchet device to allow a strap shaft to rotate toward the lever when the lever is pivoted away from the body. A strap slot is defined in the axle and is adapted to hold the other end of the strap. The strap is rolled on the axle to tighten the strap which binds around an object when the lever is pivoted continuously.

4 Claims, 4 Drawing Sheets

RATCHET STRAP TIGHTENER

BACKGROUND OF THE INVENTION

1. Field of the Invention

The present invention relates to a ratchet strap tightener, and more particularly to a ratchet strap tightener manufactured by a plastic injection molding process and easily assembled by manufacturers.

2. Description of Related Art

Strap tighteners are used in many applications such as packaging cargo, shipping trade, etc. to tighten straps to hold objects in place. With reference to FIG. 4, a conventional strap tightener in accordance with the prior art comprises a lever (60), body (61) and a ratchet device. The lever (60) is pivotally attached to the body (61) with the ratchet device.

The lever (60) and the body (61) have a similar structure and are made of metal. The lever (60) have two sides (not numbered) opposite to each other, two first wings (601) and a holder (602). The first wings (601) are formed at the sides of the lever (60) respectively by bending or stamping. Each first wing (601) has a through hole (not numbered), a joint edge (not numbered) and a guide (603). The through hole is defined in the first wing (601) near the joint edge of the first wing (601) and is used to pivotally connect with the body (61). The holder (602) has a hole (not shown) formed on the lever (60) between the two first wings (601). The guide (603) is defined longitudinally in the first wing (601) near the through hole.

The body (61) have two sides (not numbered) opposite to each other, two second wings (611), a holder (612) and a support bar (614). Each side of the body (61) corresponds to the respective side of the lever (60). The second wings (611) are formed at the sides of the body (61) respectively by bending or stamping. Each second wing (611) has a through hole (not numbered), a joint edge (not numbered) and a guide (613). The through hole is defined in the second wing (611) near the joint edge of the second wing (611) and is used to pivotally connect with the lever (61).

The holder (612) has a hole (not shown) and is formed on the body (61) between the two second wings (611). The guide (613) is defined longitudinally in the second wing (611) near the through hole. The support bar (614) is mounted laterally between the two second wings (611) at a distal end away from the joint edge of the second wing (611). A stationary strap loop (615) with a stationary metal ring (616) is mounted around the support bar (614).

The ratchet device includes two ratchet wheels (62), two pivot pins (63), a pawl (64), a driver (66) and two springs (65). A series of teeth (621) are formed around and a through hole (not shown) is defined in each ratchet wheel (62). The through holes in the first wings (601), the second wings (611) and the ratchet wheels (62) are aligned and a ratchet wheel (62) is mounted between the corresponding first and second wings (601, 611). The pivot pins (63) pass through the through holes, and the ratchet wheels (62) are rotatably mounted on the pivot pins (63).

The pawl (64) and the driver (66) respectively have two protrusions (641, 661) and a stub (642, 662). The pawl (64) and the driver (66) are movably and respectively mounted in the corresponding guides (603, 613) of the first and second wings (601, 611). The springs (65) are respectively mounted around the stubs (642, 662), and the stubs (642, 662) are mounted respectively in the holes in the holders (602, 612). Each protrusion (641, 661) engages one of the teeth (621) on the corresponding ratchet wheel (62). The springs (65) respectively press the pawl (64) and the driver (66) against the ratchet wheel (62) to keep the protrusions (641, 661) engaged with the teeth (621).

When the strap tightener is used to tighten a strap (71) with a running end and a fixed end, the fixed end of the strap (71) must be securely attached to the body (61). A fastening metal ring (72) connects to the stationary metal ring (616) of the stationary strap loop (615) by means of a hook (73). The running end of the strap (71) is passed around an object (not shown) and bound firmly on the pivot pin (63). When the lever (60) is pivoted toward the ratchet wheel (62), the strap (71) wound on the pivot pin (63) that rotates with the ratchet wheel (62) will be rolled onto the pivot pin (63) to tighten the strap (71).

However, the conventional ratchet strap tightener has the following shortcomings.

1. The lever (60) and the body (61) are fabricated by stamping or bending to form the wings (601, 602), the holders (602) and the guides (603), which increases the manufacturing time. The springs (65) and the stationary strap loop (615) have to be mounted on and attached to the ratchet strap tightener, which increases the assembly time.

2. When the metal strap tightener is used in polluted environment that contains salty, acidic or alkali vapors, the metal strap tightener will corrode and be damaged or wear out quickly.

3. The metal strap tightener always needs to be plated or painted to prevent rust. The plating or painting process produces contaminants that are harmful to the environment and human beings.

The present invention has arisen to mitigate or obviate the disadvantages of the conventional ratchet strap tightener.

SUMMARY OF THE INVENTION

The main objective of the present invention is to provide a light weight ratchet strap tightener that can be quickly manufactured by using a plastic injection molding process.

Another objective of the present invention is to provide a ratchet strap tightener that overcomes the rust problem of metal by making the tightener from plastic.

Further benefits and advantages of the present invention will become apparent after a careful reading of the detailed description with appropriate reference to the accompanying drawings.

DETAILED DESCRIPTION OF THE INVENTION

Figure 1:
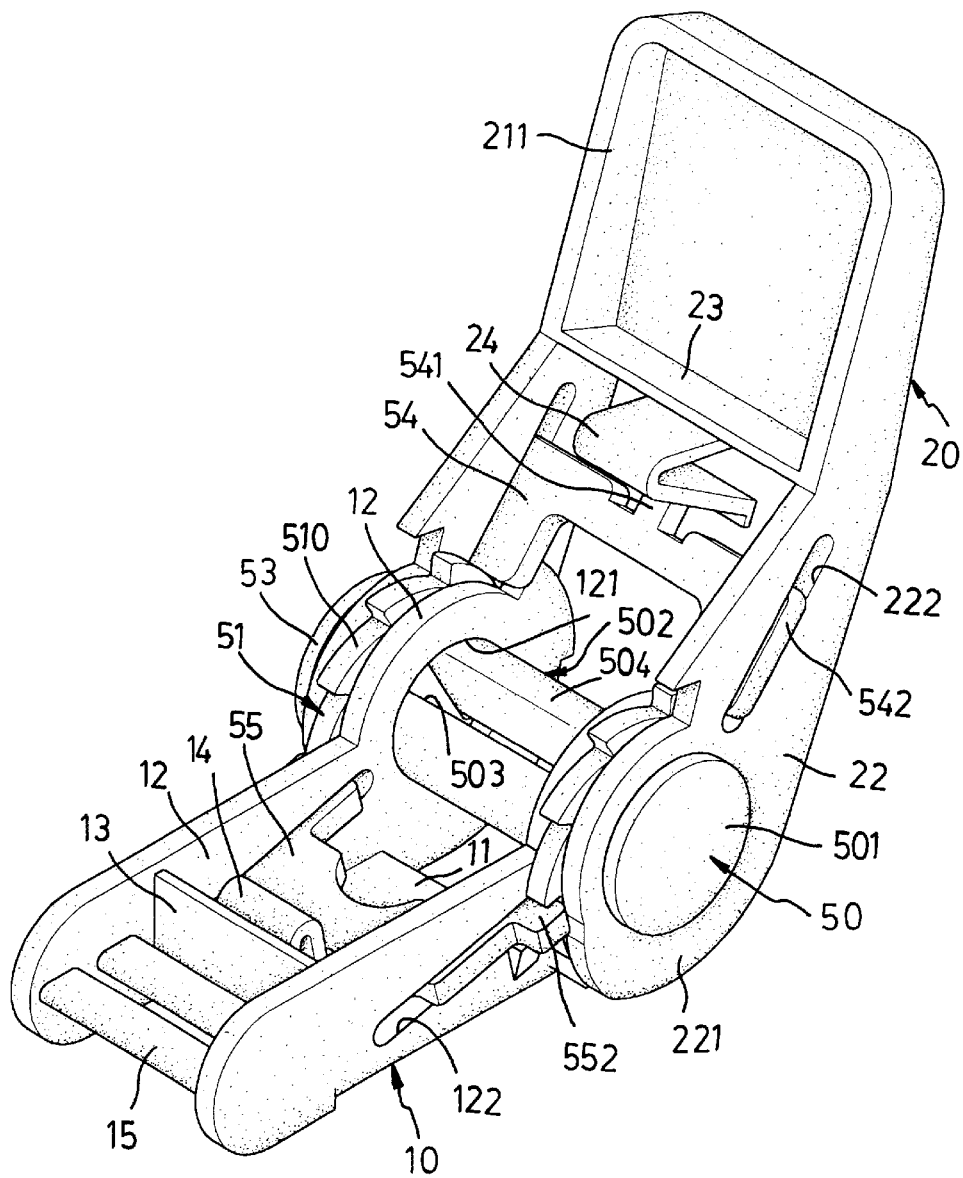
FIG. 1 is a perspective view of a ratchet strap tightener in accordance with the present invention.
Figure 2:
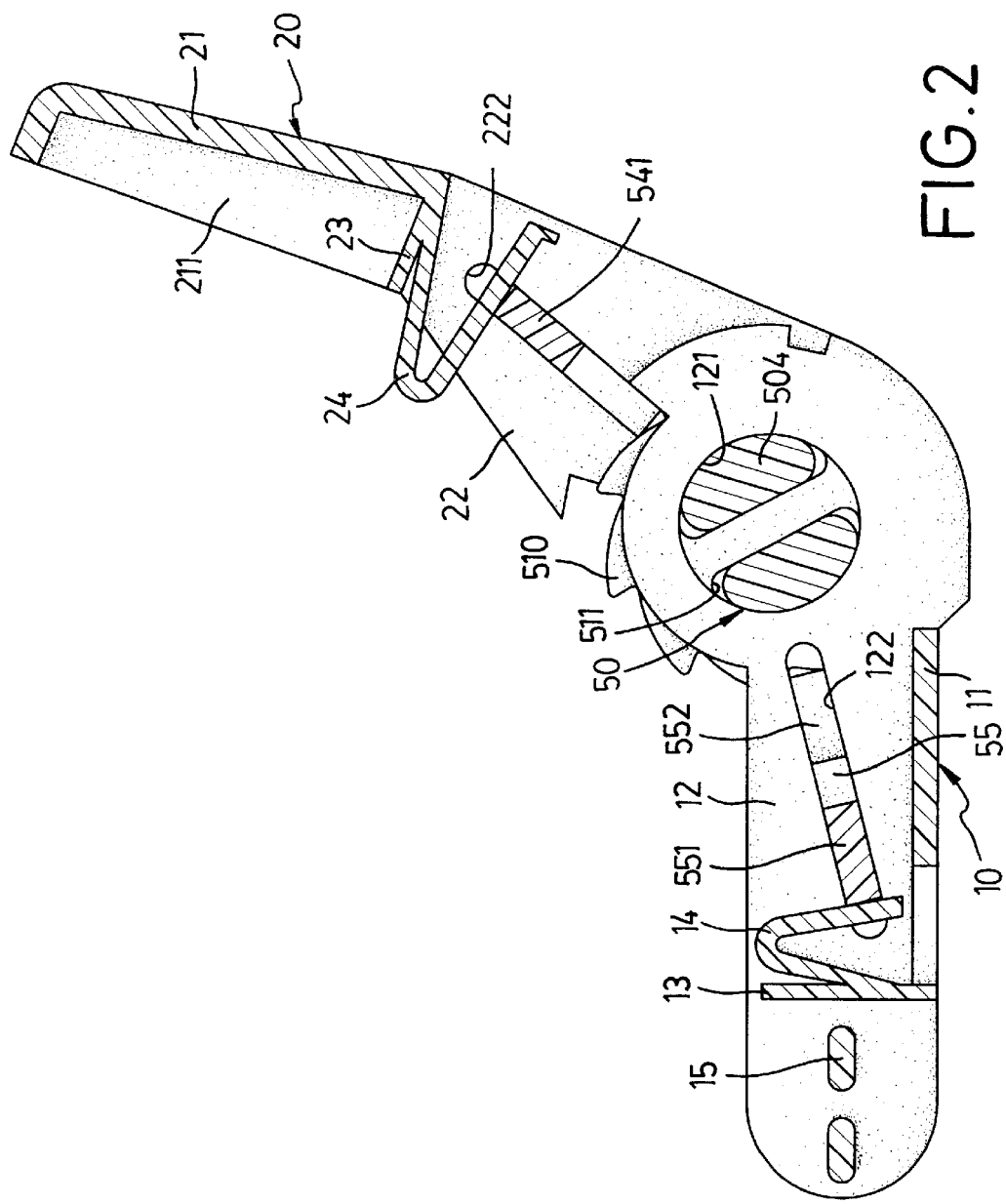
FIG. 2 is a cross sectional side plan view of the ratchet strap tightener in FIG. 1.

With reference to the drawings and initially to FIGS. 1 and 2, a ratchet strap tightener in accordance with the present invention is manufactured by a plastic injection molding process and comprises a body (10), a lever (20) and a ratchet device.

The body (10) is made of plastic by a plastic injection molding process. The body (10) has a base (11), two first wings (12), a stop (13), a biasing member (14) and two strap holders (15).

The base (11) has two opposite sides (not numbered), and the first wings (12) are formed in parallel at the opposite sides respectively and perpendicular to the base (11). Each first wing (12) has a distal edge (not numbered), a proximal edge (not numbered), a pivot hole (121) and a radial slot (122). The distal edge of each first wing (12) is enlarged, and the pivot hole (121) is defined laterally in each first wing (12) at the distal edge. The radial slot (122) is defined through the first wing (12) near the pivot hole (121) along an extended radius of the pivot hole (121). The stop (13) is formed vertically between the two first wings (12) and connects to each first wing (12) at a position between the radial slot (122) and the proximal edge of the first wing (12). The biasing member (14), is V-shaped, is formed directly on the stop (13) and faces toward the distal edge of the first wings (12). The biasing member (14) can also be U-shaped or inverse V-shaped. The strap holders (15) are formed integrally in parallel between the two first wings (12) near the proximal edge of the first wings (12).

Similarly, the lever (20) is made of plastic by a plastic injection molding process. The lever (20) has a lever base (21), two second wings (22), a stop (23) and a biasing member (24). The lever base (21) has two opposite sides (not numbered) and a sidewall (211). The opposite sides of the lever base (21) correspond to the opposite sides of the base (11) respectively and the sidewall (211) is formed integrally with and extends perpendicular from the lever base (21) around the lever base (21). Consequently, a user can easily squeeze the lever (20) to tighten a strap.

Each second wing (22) extends from the sidewall (211) respectively at opposite sides of the lever base (21) and has an enlarged end (221), a pivot hole (not shown) and a radial slot (222). The enlarged end (221) is away from the lever base (21) of the lever (20). The pivot hole is defined through the second wing (22) at the enlarged end (221). The radial slot (222) is defined in the second wing (22) near the pivot hole of the second wing (22) along an extended radius of the pivot hole.

The stop (23) is formed integrally between the two second wings (22) on the sidewall (211). The biasing member (24), is V-shaped, is formed on the stop (23) and faces toward the enlarged end (221) of the second wing (22). In another embodiment, the biasing member (24) can also be U-shaped or inverse V-shaped.

The ratchet device includes a strap shaft (50), two ratchet wheels (51), a C-clip (53), a driver (54) and a pawl (55). The strap shaft (50) has an enlarged head (501) and a shaft (502) with two ends. The enlarged head (501) is formed at one end of the shaft (502), and an annular groove (not shown) is defined around the other end of the shaft (502). A strap slot (503) is defined laterally in the shaft (502) and divides the shaft (502) into two semicircular shafts (504). A series of teeth (510) are defined around the ratchet wheel (51), and two semicircular holes (511) are defined in the ratchet wheel (51). The semicircular shafts (504) pass through the semicircular holes (511) respectively. The ratchet wheel (51) is shaped like a Greek letter "Θ".

The lever (20) is pivotally connected to the body (10). Each ratchet wheel (51) is mounted between each pair of the second wing (22) and the first wing (12). The semicircular holes (511), the pivot hole (121) in the first wings (12) and the pivot hole in the second wings (22) are aligned, and the shaft (502) of the strap shaft (50) passes through those holes from one end. The semicircular shafts (504) pass through the semicircular holes (511) of the ratchet wheels (51) respectively so the strap shaft (50) rotates with the ratchet wheels (51). The C-clip (53) is mounted in the annular groove around the shaft (502) to hold the strap shaft (50) in those holes.

To allow the ratchet wheel (51) to rotate only toward the lever (20), the pawl (55) has a stud (551) and two protrusions (552). The driver (54) has a stub (541) and two protrusions (542) to drive the ratchet wheels (51) when the lever (20) is pivoted away from the body (10). The pawl (55) and the driver (54) are movably mounted in the corresponding radial slots (122, 222) respectively. Each of the stubs (541, 551) abuts the respective biasing members (14, 24), and each of the protrusions (542, 552) engages one of the teeth (510) of each respective ratchet wheel (51). The lever (20) rotates the ratchet wheel (51) and the strap shaft (50) toward the lever (20).

Figure 3:
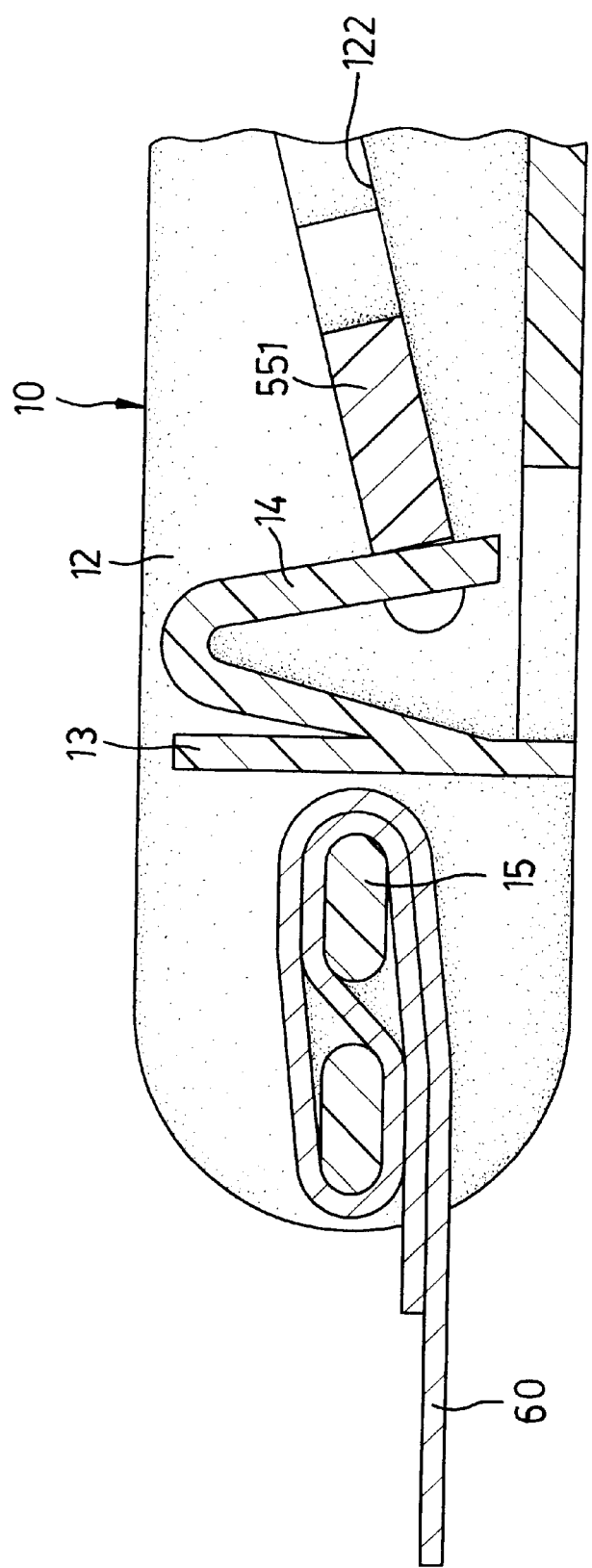
FIG. 3 is an enlarged, cross sectional side plan view of the ratchet strap in FIG. 1 a strap securely attached to the ratchet strap tightener.
Figure 4:
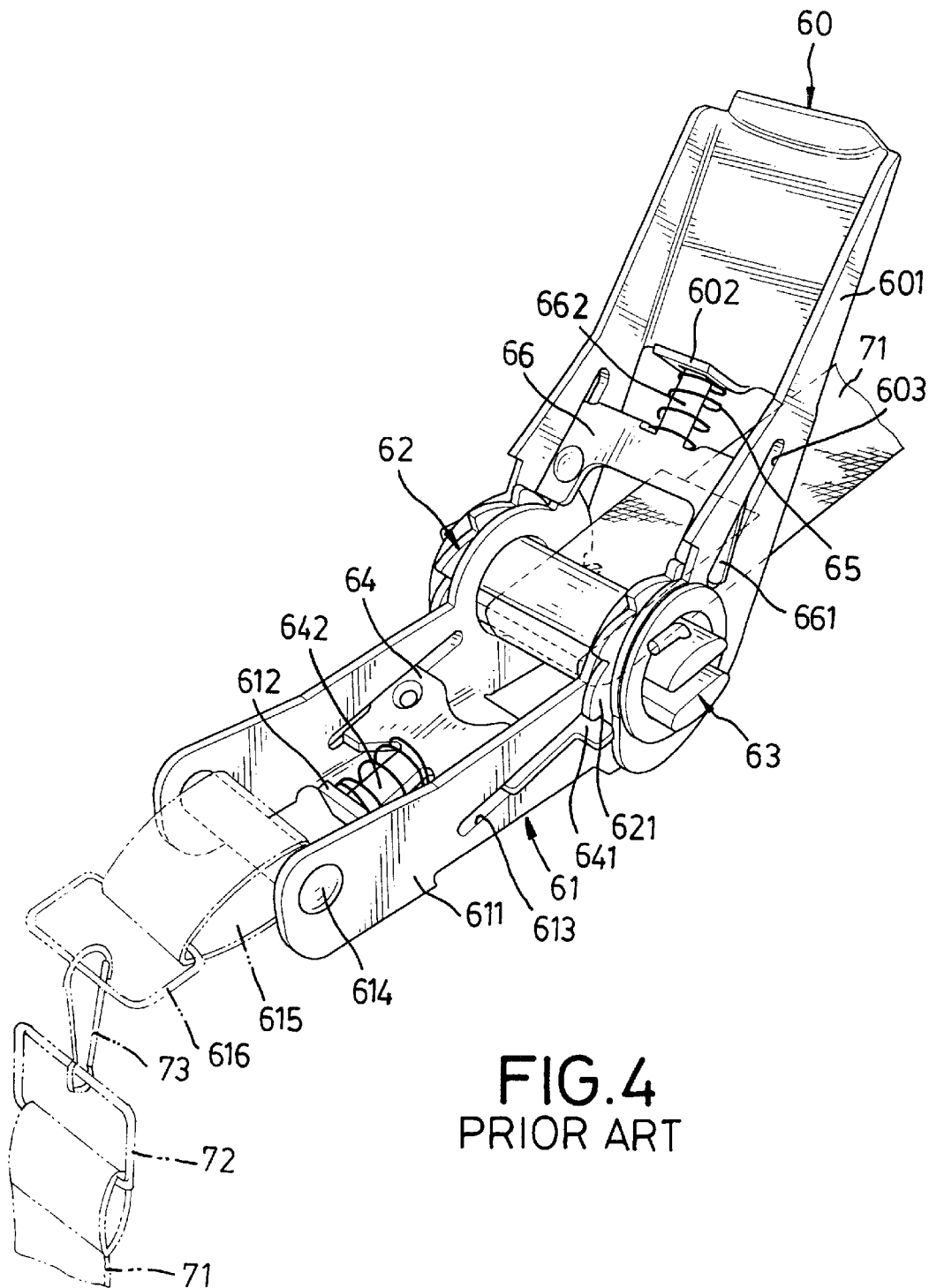
FIG. 4 is a perspective view of a conventional ratchet strap tightener in accordance with the prior art.

With further reference to FIG. 3, a strap (60) with a free end is attached to the two strap holders (15). When the ratchet strap tightener tightens the strap (60) that holds an object (not shown), the strap (60) is held on the strap holders (15) because friction exist folds in the strap (60). Consequently, the free end of the strap (60) is easy attached to the ratchet strap tightener without using a hook or a permanent stationary strap loop. An operator is easy to replace the strap (60) when the strap (60) is damaged or worn out by an extensive use. The ratchet strap tightener is so convenient for the operator to tighten the strap (60) to hold the object.

The ratchet strap tightener as described has the following advantages.

1. Light and easy to assemble:

Because the ratchet strap tightener is made of plastic by a plastic injection molding process, the strap tightener is light and has less parts. The wings (12, 22), the stops (13, 23), the biasing members (14, 24) and the strap holders (15) are integrally formed in the plastic injection molding process. No more stamping or bending is needed, and the manufacturer can easily assemble the parts.

2. Can be used in many applications:

The plastic strap tightener does not have the rust problem. Because the plastic strap tightener is rust resistant, a chemical resistant and resistant to corrosive salt, it can be used in many applications.

3. Environment friendly:

The ratchet strap tightener is made of plastic that is recycled material. The plastic strap tightener does not need to be plated or painted. Without the necessity for plating or painting, the environment will be subjected to fewer pollutants.

Although the invention has been explained in relation to its preferred embodiment, it is to be understood that many other possible modifications and variations can be made without departing from the spirit and scope of the invention as hereinafter claimed.

What is claimed is:

1. A ratchet strap tightener comprising:
   a body made of a plastic material and comprising
      a base having two opposite sides;
      a first wing with a distal edge and a proximal edge formed at each of the opposite sides of the base, and each first wing having
         a pivot hole defined in the distal edge; and a radial slot defined in the first wing near the pivot hole along an extended radius of the pivot hole;

a stop formed integrally between the two first wings and connecting to the first wings at a position between the radial slot and the proximal edge of the first wing;

a V-shaped biasing member integrally formed on the stop and facing toward the distal edge of the first wing; and two strap holders formed in parallel between the two first wings near the proximal edges of the first wings and adapted to hold one end of a strap;

a lever made of a plastic material and comprising a lever base having two opposite sides corresponding to the opposite sides of the base respectively;

a second wing formed at each of the opposite sides of the lever base, each second wing having an enlarged end away from the lever base of the lever;

a pivot hole defined through the enlarged end; and a radial slot defined in the second wing near the pivot hole of the second wing along an extended radius of the pivot hole of the second wing;

a stop formed integrally between the two second wings; and a V-shaped biasing member integrally formed on the stop and the biasing member facing toward the enlarged ends of the second wings; and a ratchet device comprising a strap shaft having an enlarged head and a shaft with two ends, and the enlarged head formed at one end of the shaft, and the shaft mounted in the pivot holes of the first wings and the pivot holes of the second wings;

a ratchet wheel with a series of teeth defined around the ratchet wheel mounted between each pair of the second wing and the first wing, and each ratchet wheel mounted on the strap shaft; and a pawl movably mounted in the two radial slots of the first wings, and a driver movably mounted in the two radial slots of the second wings, the pawl having a stub and two protrusions, and the driver having a stub and two protrusions, and each of the stubs abutting the respective biasing member and each of the protrusions engaged with one of the corresponding teeth of each respective ratchet wheel;

wherein the lever is pivotally attached to the body with the ratchet device, and the ratchet wheel allows the strap shaft to rotate toward the lever when the lever is pivoted away from the body.

2. The ratchet strap tightener as claimed in claim 1, wherein a strap slot is defined laterally in the shaft and divides the shaft into two semicircular shafts, the strap slot is adapted to hold another end of the strap; and two semicircular holes corresponding to each other are defined in the ratchet wheels respectively, and the semicircular holes, the pivot holes in the first wings and the pivot holes in the second wings are aligned, and the semicircular shafts pass through and are held in each hole.

3. The ratchet strap tightener as claimed in claim 2, wherein an annular groove is defined around one end away from the enlarged head of the shaft, and a C-clip is mounted in the annular groove around the shaft of the strap shaft to hold the semicircular shafts in each hole.

4. The ratchet strap tightener as claimed in claim 2, wherein a sidewall is formed directly from the lever base around the lever base and perpendicular to the lever base.

\* \* \* \* \*